H. GUTH.
Alcohometer.
No. 24,556. Patented June 28, 1859.
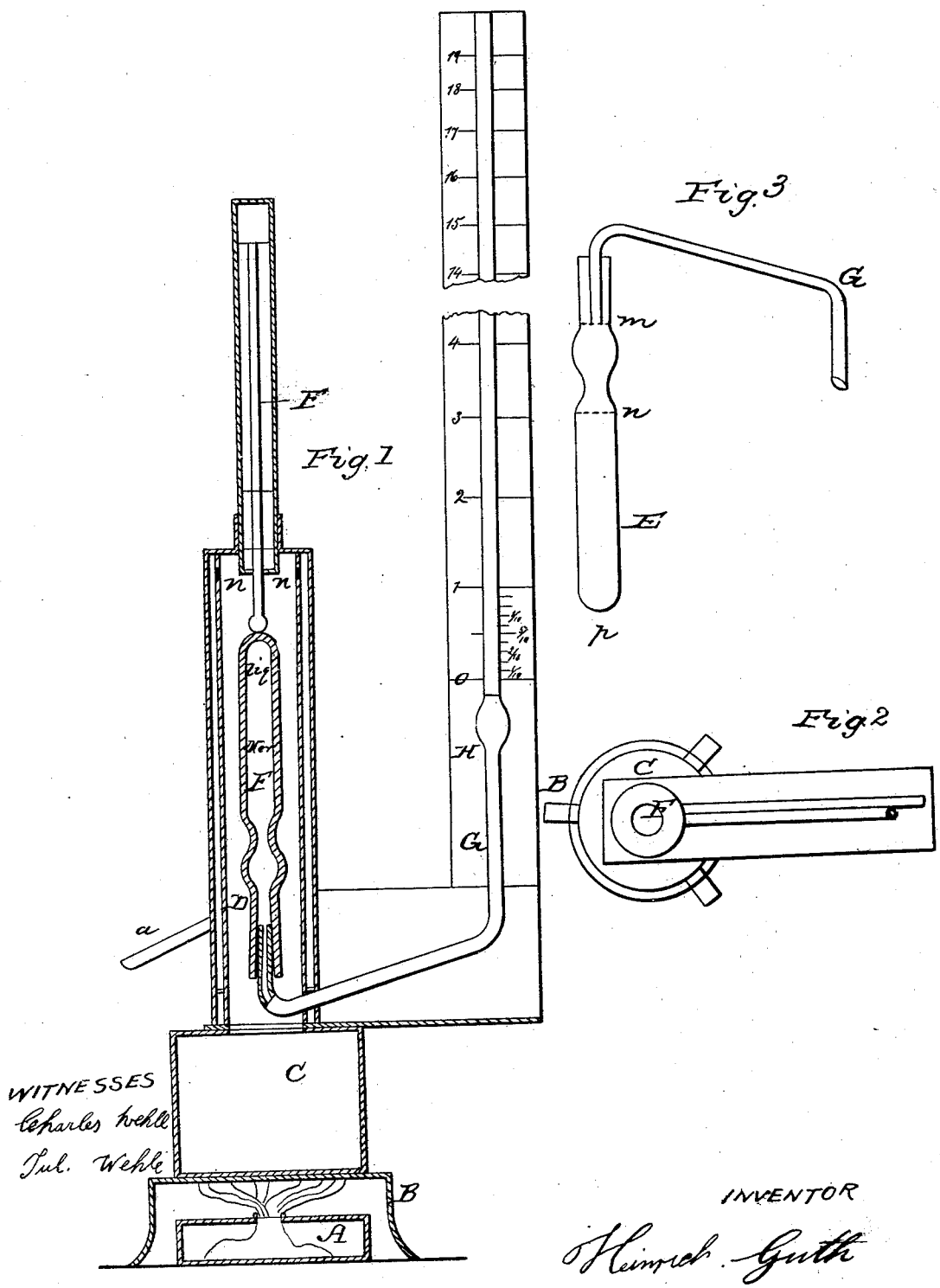

UNITED STATES PATENT OFFICE.

HEINRICH GUTH, OF NEW YORK, N. Y.

ALCOHOMETER.

Specification of Letters Patent No. 24,556, dated June 28, 1859.

*To all whom it may concern:*

Be it known that I, HEINRICH GUTH, of the city, county, and State of New York, have invented a new and useful Instrument which I have termed "Alcohol-Indicator," and that the following is a full, clear, and exact description thereof, reference being had to the annexed drawings, making part of this specification, in which—

Figure 1, is a vertical section, Fig. 2, a horizontal projection, Fig. 3 a view of the manner of filling said instrument.

Similar letters of reference indicate corresponding parts in these various figures.

The nature of my invention consists in constructing an alcohol-indicator in such a manner, that the exact quantity of pure alcohol contained in any fluid may be ascertained by the effect of the evaporation of the said fluid on mercury as hereinafter described.

To enable others skilled in the art to make and use my invention I will proceed to describe its construction and operation.

My alcohol-indicator consists of a spirit lamp A, a water vessel C, a tube D, containing a glass vessel E and the lower portion of a thermometer F; a glass tube G fixed to a graduated scale H. These various parts are made in such a manner that they may be joined together in one apparatus as shown on the drawing or taken asunder if desired.

The water vessel C stands on legs or bases B in order to admit the spirit lamp A under it. The tube D forms a double cylinder the inner tube of which contains valves $n, n$ near its upper portion; and a small pipe $a$ is connected with the lower part of the outside tube. The glass tube G is made to fit closely into the mouth of the glass vessel E.

The amount of alcohol contained in a fluid is ascertained by this instrument in the following manner. The vessel E is filled with mercury to the line $n$ in Fig. 3; the liquor to be analyzed is then poured into the vessel to the line of $m$; the end of the glass tube G is then inserted into E, and the whole is then placed in the position of Fig. 1, when the mercury will sink to the bottom and the liquor will rise to the top of E. The spirit lamp is then ignited and the water contained in the vessel C will be boiling and the steam ascend into the cylinder D. The valves $n$ being so arranged as to open when the steam is too powerful, and the thermometer F showing the heat of the steam, it will be easy to regulate the heat in the cylinder to about 100 degrees of Celsius. At that heat the liquor in E will evaporate gradually and the pressure of these vapors will force the mercury upward.

The graduated scale H contains division lines marked 0, 1, 2, 3, 4 and so forth to the number 19; and subdivision lines marked $\frac{1}{10}, \frac{3}{10}, \frac{5}{10}$, and so forth; the main division lines denote the percentage of alcohol and the subdivision lines denote tenth parts of per cents. If for instance the mercury rises to the line marked 14 and to subdivision line $\frac{7}{10}$, it would indicate that the liquor contains $14\frac{7}{10}$ per cent. of alcohol. It will be observed that the division lines of the graduated scale are not placed in equal distances; for the pressure of alcoholic vapors on mercury does not increase in exact proportions to the alcoholic contents of the liquor to be analyzed.

I deem it proper to state that the alcohol indicator herein described is especially applicable to the investigation of wine, beer, vinegar, cider, ale, and fermenting liquids; as requiring a graduated scale of moderate length.

The advantage afforded by this instrument for the investigation of alcoholic contents consists mainly in the great ease and exactness of its operation.

I am aware that thermometers have been employed as alcohol meters, founded on the principle that a certain temperature of the alcoholic vapor corresponds with a certain content of alcohol in a liquid. In using however the thermometer for that purpose a separate calculation is required for every investigation, whereas my alcohol indicator shows the percentage of alcohol direct on the scale. I therefore do not claim broadly the use of alcoholic vapors for the purpose of calculating the percentage of alcohol as my invention but—

What I claim as new and desire to secure by Letters Patent is:

An alcohol-indicator substantially such as described, by which the evaporation of a fixed quantity of alcoholic liquid is made to indicate the exact percentage of alcohol contained in the said liquid for the purpose set forth.

Dated New York March 23, 1859.

HEINRICH GUTH.

Witnesses:
 CHARLES WEHLE,
 JUL. WEHLE.